(12) United States Patent
Chandu et al.

(10) Patent No.: US 9,332,155 B2
(45) Date of Patent: May 3, 2016

(54) DIGITAL IMAGE HALFTONE CONVERSION WITH SELECTIVE ENHANCEMENT

(71) Applicants: Kartheek Chandu, Longmont, CO (US); Mikel J. Stanich, Longmont, CO (US)

(72) Inventors: Kartheek Chandu, Longmont, CO (US); Mikel J. Stanich, Longmont, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/172,827

(22) Filed: Feb. 4, 2014

(65) Prior Publication Data

US 2015/0222788 A1 Aug. 6, 2015

(51) Int. Cl.
| | |
|---|---|
| H04N 1/405 | (2006.01) |
| H04N 1/409 | (2006.01) |
| H04N 1/52 | (2006.01) |
| G06K 15/02 | (2006.01) |
| H04N 1/40 | (2006.01) |

(52) U.S. Cl.
CPC ............ *H04N 1/405* (2013.01); *G06K 15/1881* (2013.01); *H04N 1/409* (2013.01); *H04N 1/40087* (2013.01); *H04N 1/52* (2013.01)

(58) Field of Classification Search
None
See application file for complete search history.

(56) References Cited

U.S. PATENT DOCUMENTS

| | | | |
|---|---|---|---|
| 4,547,811 A * | 10/1985 | Ochi | H04N 1/40062 358/466 |
| 5,267,330 A * | 11/1993 | Masuda | 358/2.1 |
| 5,704,021 A | 12/1997 | Smith et al. | |
| 5,805,734 A * | 9/1998 | Ebner | 358/3.14 |
| 5,923,774 A | 7/1999 | Ostromoukhov | |
| 5,970,178 A | 10/1999 | Lin | |
| 6,347,153 B1 | 2/2002 | Triplett et al. | |
| 6,563,957 B1 | 5/2003 | Li et al. | |
| 6,731,400 B1 * | 5/2004 | Nakamura et al. | 358/1.9 |
| 6,775,032 B2 * | 8/2004 | Jacobs | 358/3.14 |
| 6,791,718 B1 | 9/2004 | Allebach et al. | |
| 6,801,337 B2 | 10/2004 | Bhaskar et al. | |
| 6,917,443 B1 | 7/2005 | Wang | |
| 7,164,493 B1 * | 1/2007 | Matsumoto et al. | 358/1.9 |
| 7,277,204 B2 | 10/2007 | Krol et al. | |
| 7,446,904 B2 | 11/2008 | Stanich et al. | |
| 7,460,276 B2 | 12/2008 | Xu et al. | |
| 7,593,135 B2 | 9/2009 | Luo et al. | |
| 7,768,673 B2 * | 8/2010 | Pellar | 358/3.13 |
| 7,911,646 B2 | 3/2011 | Chang | |
| 7,941,750 B2 | 5/2011 | Laughlin | |
| 8,282,182 B2 * | 10/2012 | Chandu et al. | 358/3.06 |
| 8,576,448 B2 * | 11/2013 | Shacham et al. | 358/3.06 |
| 8,773,722 B2 * | 7/2014 | Chandu et al. | 358/3.06 |
| 2004/0233477 A1 | 11/2004 | Stanich et al. | |
| 2005/0063013 A1 | 3/2005 | Li et al. | |

(Continued)

OTHER PUBLICATIONS

Kartheek Chandu, Mikel Stanich, Chai Wah Wu, Barry Trager, "Direct multi-bit search (DMS) screen algorithm", Sep. 30, 2012-Oct. 3, 2012, Image Processing (ICIP), 2012 19th IEEE International Conference, pp. 817-820.*

(Continued)

*Primary Examiner* — Scott A Rogers
(74) *Attorney, Agent, or Firm* — Blakely, Sokoloff, Taylor & Zafman LLP

(57) ABSTRACT

A method is disclosed. The method includes receiving a first image as a continuous tone image, screening the image to render a second image as a (Halftone Image) HTI, selecting an area of the first image for enhancement, and iteratively processing the selected area of the first image to render a third image as a multibit HTI.

16 Claims, 6 Drawing Sheets

(56) References Cited

U.S. PATENT DOCUMENTS

| | | | |
|---|---|---|---|
| 2007/0002410 | A1 | 1/2007 | Majewicz |
| 2009/0046850 | A1 | 2/2009 | Au et al. |
| 2010/0033764 | A1 | 2/2010 | Guo et al. |
| 2010/0045722 | A1 | 2/2010 | Chandu et al. |
| 2011/0141525 | A1 | 6/2011 | Ng et al. |
| 2011/0142340 | A1 | 6/2011 | Guo et al. |

OTHER PUBLICATIONS

Dhiraj Kacker and Jan P. Allebach, "Aperiodic Micro Screen Design using DBS and Training", Dec. 14, 2014, SPIE vol. 3300, pp. 386-397.*

Sagar Bhatt, John Harlim, Joel Lepak, Robert Ronkese, John Sabino, "Direct Binary Search with Adaptive Search and Swap", Aug. 10, 2005, University of Minnesota, pp. 1-9.*

Lee, Changhyung, et al., "The Hybrid Screen—Improving the Breed", IEEE 1057-7149, (2010), 435-450.

PCT Search Report and Written Opinion, PCT/US12/71516, Mar. 13, 2013, 9 pages.

Allebach, Jan, "DBS: Retrospective and Future Directions", Proceedings of SPIE, vol. 4300 (2001), 358-376.

Bhatt, Sagar, et al., "Direct Binary Search with Adaptive Search and Swap", Aug. 10, 2005, 1-9.

* cited by examiner

DIGITAL IMAGE HALFTONE CONVERSION WITH SELECTIVE ENHANCEMENT

FIELD OF THE INVENTION

The invention relates to the field of image reproduction, and in particular, to digital halftoning.

BACKGROUND

Digital halftoning is a technique for displaying a picture on a two-dimensional medium, in which small dots and a limited number of colors are used. The picture appears to consist of many colors when viewed from a proper distance. For example, a picture consisting of black and white dots can appear to display various gray levels. Digital printers, which were initially pure black and white machines with a very coarse resolution, have evolved to accommodate colors, finer resolutions, and more recently, more than one bit of information per pixel (referred to as "multibit" or "multi-tone").

For electrophotographic (EP or Laser) printers, documents are typically screened using binary periodic halftones at specific picture element (PEL) resolutions and halftone Line Per Inch (LPI) frequencies. The documents are printed as binary periodic dots. Multibit ink control is available in many ink jet printers. Such a printer can print a small, medium, large, or no dot. The halftone screening may allow for this when converting from the continuous or binary format of an original image Halftoning algorithms can be divided into three categories 1) point operations, 2) neighborhood processes, and 3) iterative processes. In the first category "point operations", each pixel in the original continuous-tone image is processed independently producing a corresponding PEL in the output image. An input continuous tone image may have 8, 12, or even 16 bits to provide a color value or depth for one or more different color planes for each pixel. Screening of this "point operation" type is the most common halftoning implementation found in printers. This is the least compute intense halftoning process. The processing involves comparing the digital count of each PEL in the original contone (continuous tone) input image with one or more thresholds from a matrix of threshold values. The result is the assignment of a native tone at each pixel in the output-device rasterized image based on the comparison. The native tones are the different drop sizes available e.g. none, small, medium and large.

In the second category "neighborhood processes", processing is applied to a region of PELs around the PEL of interest where the result of the processing is quantized to select the appropriate native tone. The most common algorithm in this category is "Error Diffusion".

The third category "iterative processes" creates halftone images iteratively by adjusting the drop locations and sizes to minimize a perceptual error metric formed from the difference between the filtered halftoned and filtered contone images. Iterative methods are the most computationally intensive of all digital halftoning methods, but they yield significantly better output quality than ordered dithering and error diffusion. The third method has the potential to produce results where the detail in the halftoned image approach the level of detail in the contone image, whereas point operation screening, the most common, is much more limited, due to the fixed screen dot positions.

SUMMARY

In one embodiment, a method is disclosed. The method includes receiving a first image as a continuous tone image, screening the image to render a second image as a (Halftone Image) HTI, selecting an area of the first image for enhancement, and iteratively processing the selected area of the first image to render a third image as a multibit HTI.

BRIEF DESCRIPTION OF THE DRAWINGS

A better understanding of the present invention can be obtained from the following detailed description in conjunction with the following drawings, in which.

DETAILED DESCRIPTION

A continuous tone to multibit halftoning is described with selective enhancement. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
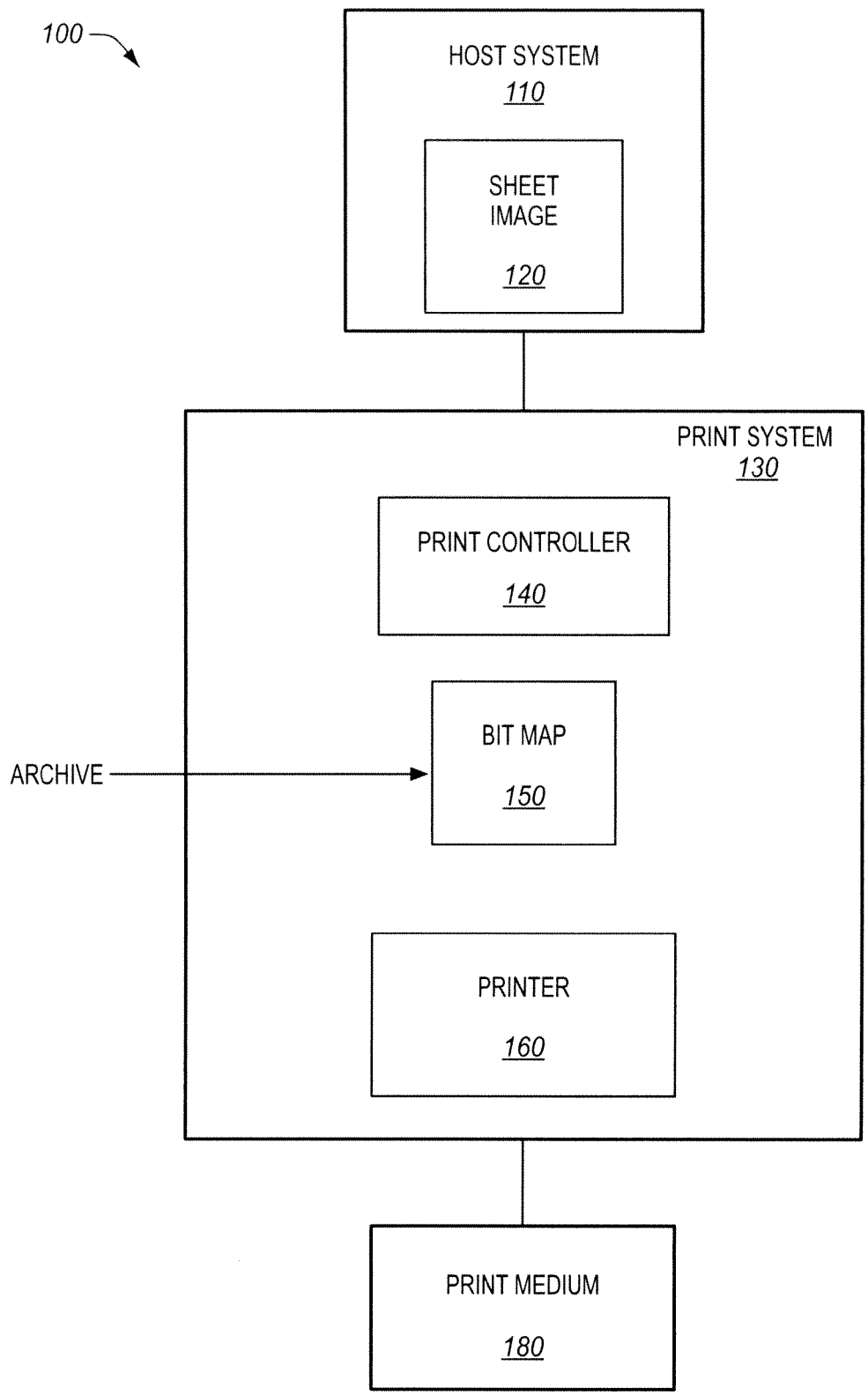
FIG. 1 illustrates one embodiment of a printing network.

FIG. 1 is a block diagram illustrating a printing network 100. Network 100 includes a host system 110 in communication with a printing system 130 to print a sheet image 120 onto a print medium 180 (e.g., paper) via a printer 160. The resulting print medium 180 may be printed in color and/or in any of a number of gray shades, including black and white.

The host system 110 may include any computing device, such as a personal computer, a server, or even a digital imaging device, such as a digital camera or a scanner. The sheet image 120 may be any file or data that describes how an image on a sheet of print medium should be printed. For example, the sheet image 120 may include PostScript data, Printer Command Language (PCL) data, Intelligent Printer Data Stream (IPDS) and/or any other printer language data. The print controller 140 processes the sheet image to generate a bitmap 150 for printing to the print medium 180 via the printer 160. The sheet image 120 may also be an archived version of the Bit Map 150, in which case the controller recognizes this and simply formats the image for printing without applying any halftoning. Resolution conversion might be applied to prepare the job for printing if the job was archived at a different resolution.

The printing system 130 may be a high-speed printer operable to print relatively high volumes (e.g., greater than 100 pages per minute). The print medium 180 may be continuous form paper, cut sheet paper, and/or any other tangible medium suitable for printing. In one embodiment, the printing system 130 includes the printer 160 that presents the Bit Map 150 onto the print medium 180 (e.g., via toner, ink, etc.) based on the sheet image 120. A branch from the Bit Map stage 150 illustrates archiving. The archiving may be to a separate system or to the host system 110, for example.

Figure 2:
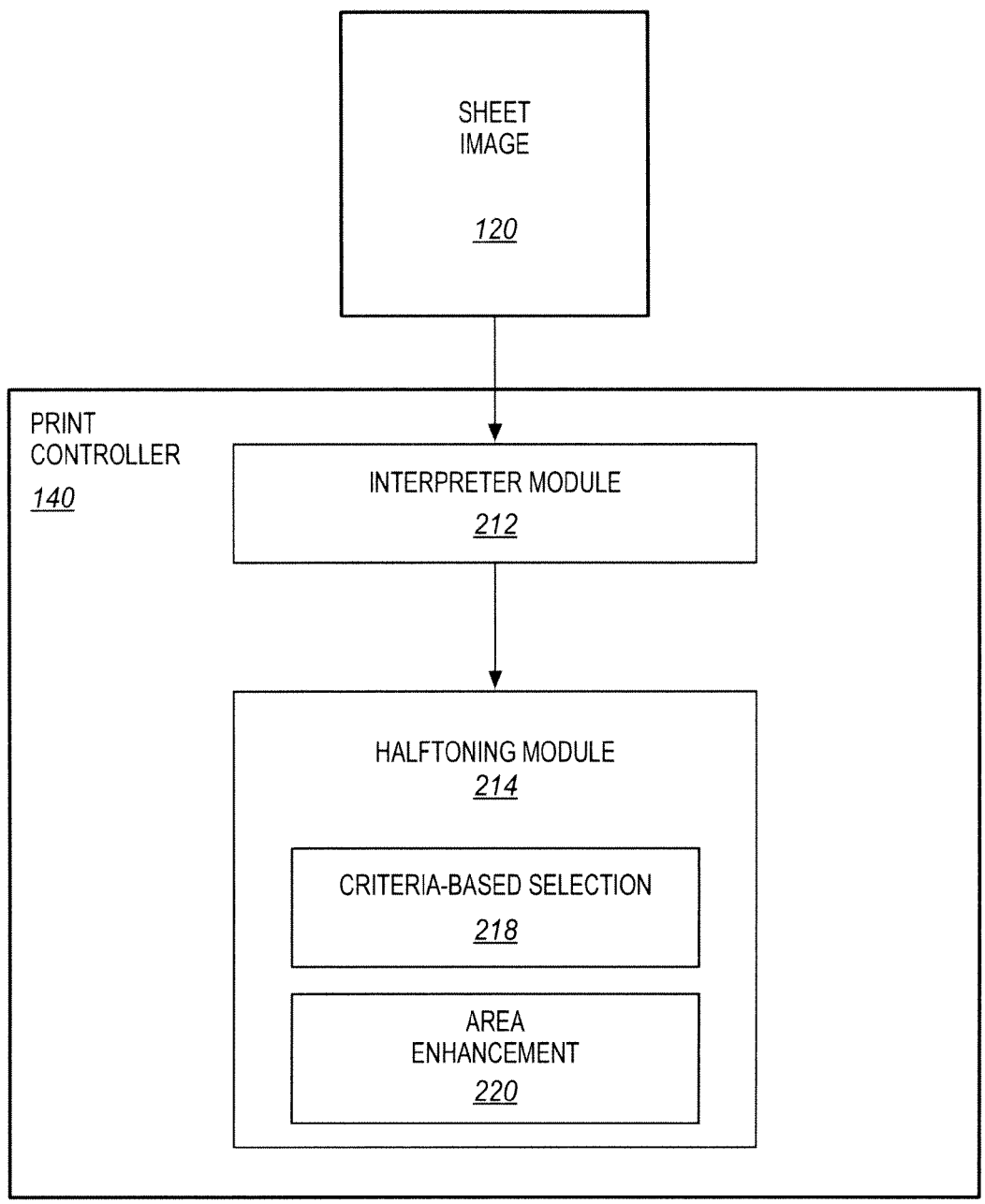
FIG. 2 illustrates one embodiment of a print controller.

The print controller 140 may be any system, device, software, circuitry and/or other suitable component operable to transform the sheet image 120 for generating the Bit Map 150 in accordance with printing onto the print medium 180. FIG. 2 is a block diagram illustrating an exemplary print controller 140.

Referring to FIG. 2, the print controller 140, in its generalized form, includes an interpreter module 212 and a halftoning module 214. In one embodiment, these separate components represent hardware used to implement the print controller 140. Alternatively or additionally, the components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a two-dimensional array of pixels representing an image of the print job e.g., a continuous tone image (CTI), or contone image also referred to as full sheetside bitmaps.

The two-dimensional pixel arrays are considered "full" sheetside bitmaps because the bitmaps include the entire set of PELs for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as patterns, having one or more different ink drop sizes or LASER beam exposure levels. For example, the halftoning module 214 may convert the continuous tone sheetside bitmaps to a pattern of ink drops for application to the print medium 180 (e.g., paper). Once computed, the halftoning module 214 transfers the converted sheetside bitmaps to the print head controllers of the printer 160 to apply the ink drop(s) to the tangible medium 180.

In the illustrated example, the halftoning module 214 includes a Selection Module 218 and an Area Enhancement module 220 as described in more detail below. These modules allow the print controller 140 to selectively alter the halftoning from a simpler screening or point based operation to a more complex neighborhood area, iterative or search-based halftoning operation.

Many printer use point based operation halftoning as a compromise between image quality and performance. Implementing an iterative based halftoning operation for all image data is computationally expensive. Iterative or search-based halftone methods require several passes of processing to determine the final halftone image.

A hybrid, using a selective combination of point operations and iterative operations, may be used to achieve higher image quality in screening images. The halftone image quality may be enhanced by first screening the entire image normally using a point operation method. After the screening, an iterative halftone method may be used for all or some parts of the image to further refine and improve the quality of the entire image or in selected locations. For example the iterative halftone method may be used for a single color plane in particular the black plane that contains a large amount of the detail information. Another selective application would be to apply iterative screening only to natural scene images, having high image activity content, and not to line art or text, etc. This combination requires less computation time or resources than applying iterative methods to the entire image. In addition providing a high quality initial version of the screened image for iterative halftoning is beneficial to reduce computational time for the selective processing.

In some cases, a selective approach may achieve results equal to iterative processing of the whole image. Many documents have a combination of line art, text, and images. The line art and text are successfully produced using simple screening methods. The iterative processing may then be restricted, for example, to images and other more complex parts of the document.

Figure 3:
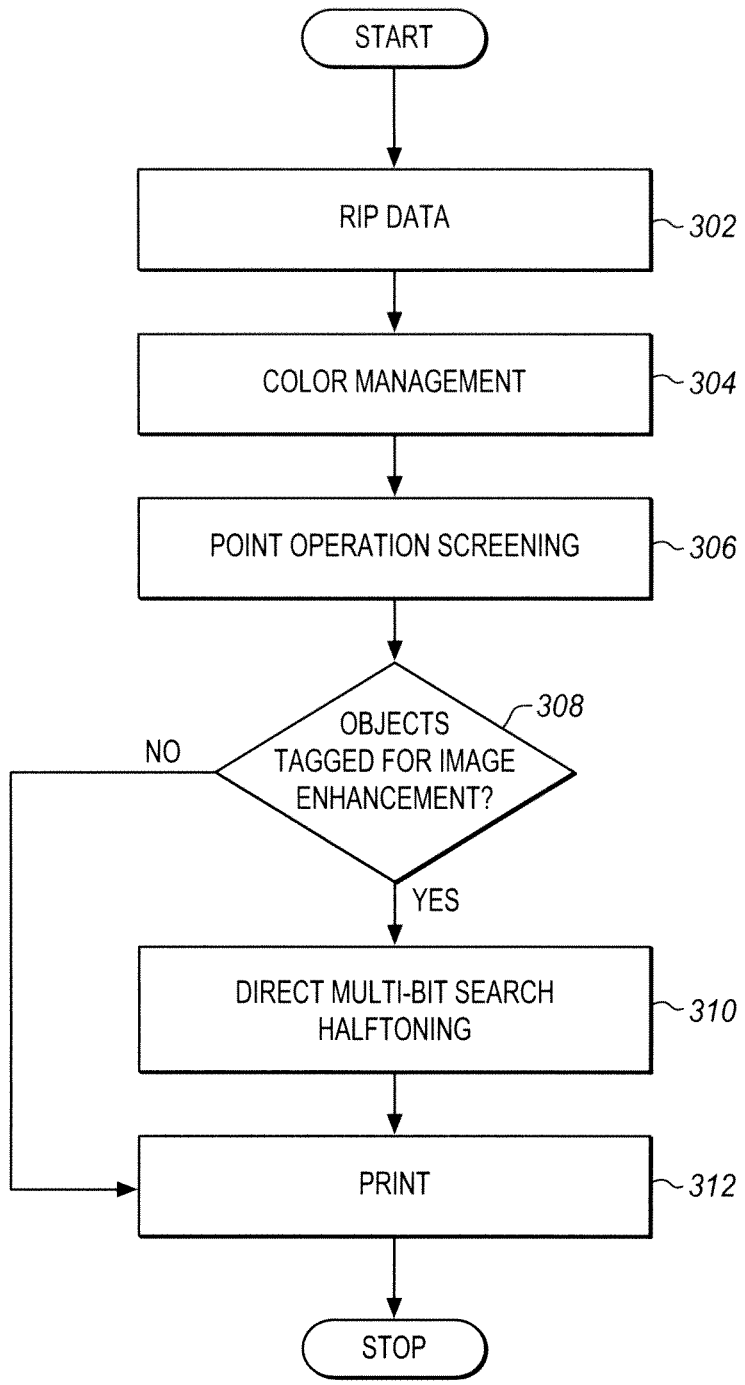
FIG. 3 illustrates a process flow of converting an image according to an embodiment.

One approach is shown in the process flow diagram of FIG. 3. The process flow begins with a sheetside image in any of a variety of formats. In the illustrated example it is RIP (Raster Image Processor) data at 302. A variety of different operations may be performed to bring the sheetside image to this format by an interpreter. A variety of different processes may be performed to the RIP data before halftoning. At 304, color management is applied. For a multiple color image, the image may be divided into its respective color components. The data may also be converted from one color plane to another. In the example, herein, the processing is applied in a CMYK color plane, but the invention is not so limited.

At 306 point operation screening is applied to each color plane of the image. Screening may be done in any of a variety of different ways. Typically point screening is performed by examining each pixel of the RIP data independently. The color value of each pixel is compared to a threshold for the corresponding point of the screened image. The threshold values form a matrix of values that are tiled across the contone data for the purpose of the comparison. For binary printing, a value above the threshold will be converted to an ink dot or 1. A value below the threshold is converted to no dot or 0.

For multibit printing, the value will be compared to multiple thresholds. Below a low threshold value the resulting screened image pixel is rendered to 0. A value larger than the low threshold but smaller than a medium threshold value renders that pixel to a small dot. Between a medium threshold value and a large threshold value the result is a medium dot, and finally a value above the highest threshold will be rendered as a large dot for that pixel. The threshold compare operation is typically performed with image data at the device resolution. In a two bit rendering system (2^2 levels) a small, medium, and large drop system can produce four different drop sizes at each pixel location including the no drop size. Similarly a four bit system can create sixteen levels.

At 308, objects in the point screened image that have been tagged for enhancement are selected. At 310 an iterative halftoning operation is applied to the tagged objects. Note that the iterative operation is applied after the screening and may be applied using the screened version of the image as the initial image. In one example, a direct multi-bit search is applied, although other iterative processes may be used, depending on the particular implementation. When all of the tagged objects are enhanced or, alternatively, if there are not tagged objects, then the document is printed at 312. Additional processing operations may be added between the halftoning at 310 and the printing at 312, depending on the application.

The decision 308 of which images to select for this further processing at 310 can be based on any of a variety of different criteria including the job, the page or the object type. The processing to achieve the best quality may be applied to an entire job or on a single page, such as a title page or a cover page. For object type screening the processing may be restricted to a few types of objects. As an example, natural scene image data may be given a high priority. Synthetic objects and objects that have a synthetic nature, such as text or line art may be given a low priority. Images and shading may both benefit from increased image quality screening, since they both may include more detailed or gradient features. If a logo is defined as a graphic object it may be beneficial to include graphic objects as a type to include in the high quality processing.

As an example of object types an input RIP data page or sheetside image may have different parts of the data identified using object type identifiers. The object type identifier may identify certain areas as text, line art, smooth shade, image, or transparency objects. The selection module 218 can analyze the incoming RIP data, identify the objects using the type information and then select objects of a predetermined type. The preferred types may be stored in a configuration register and may be ranked so those images are selected first. If there are few or no images, then the selection module may then select a second priority object type, such as shading.

Figure 4:
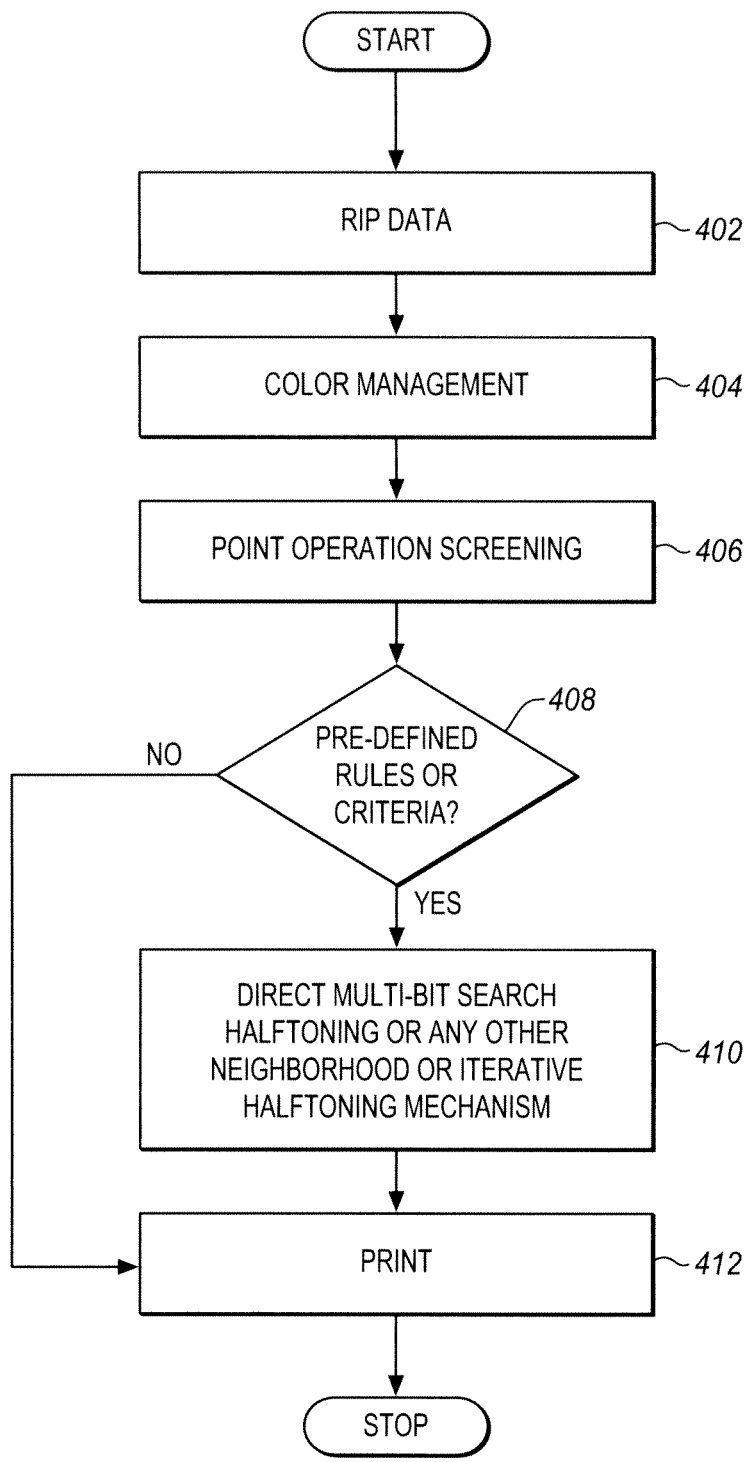
FIG. 4 illustrates an alternative process flow of converting an image according to an embodiment.

A second approach is shown in the process flow diagram of FIG. 4. As in the example of FIG. 3, at 402 RIP data is received. At 404, color management may be applied. At 406, the image is screened and at 408 a set of pre-defined rules or criteria is applied to the screened image. These rules or criteria are used to determine which areas or features will be selected for enhancement.

At 410 a neighborhood or iterative halftoning operation is applied to the selected areas and the final image is then printed at 412. If no areas are selected, then the enhancement is skipped and the process continues directly to printing.

The decision at 408 as to which features to select for this further processing at 410 can be based on any of a variety of different criteria such as RIP buffer size or even the size (area or extent) of an image represented by a feature. The halftoning module may be allowed to operate on a limited number of objects in the RIP data until the available processing power or available buffer is consumed. In this way, the total processing ability of the halftoning module is used without delaying the printing.

As to image size, small images are more difficult to print with high quality, whereas image quality for large images is typically not as critical. A configuration register may store a predetermined image size threshold. Images smaller than the threshold are selected and images larger than the threshold are not selected. An example of this type of image size intelligent halftoning is to switch between supercell and single cell screening for small image sizes.

A further refinement is to only apply the special added processing at 410 to the black color plane of an image. Screening on only the black color plane reduces the compute intensity of the processing operation, while still providing significant image quality improvements. Black is the color plane that provides most of the detailed (luminance) information. Given more processing capability, the additional processing may be applied to another color plane such as Magenta, followed by Cyan and then Yellow. Images which lack data in the black color plane might also be processed with the enhanced operation for at least the Magenta color plane.

In one embodiment, any documents or jobs will be converted to a multibit or multi tone aperiodic halftone resolution of 360 DPI for printing. In one embodiment documents are printed and the bitmap image data 150 is saved in a binary format at, for example, a host system so that the documents may be reprinted when desired without regenerating the job.

This method converts color or grayscale images in any of variety of different color spaces to multibit halftone images optimized for a particular type of printer. The operations may be adapted to suit different printers.

Electrophotographic (LASER or EP) printers typically print using clusters of halftone dots. The dots and the clusters are periodic in that they occur at regularly spaced intervals across a page. The PELs of a typical EP printer occur at 600 or 1200 DPI (dots per inch) while the halftone dot clusters may occur at 106, 85, or 141 lines per inch (LPI). The LPI indicates the frequency of the dot clusters as measured along the angle of adjacent clusters e.g. halftone screen angle. The number of PELs in a single completely filled cluster provides the number of possible gradations in the darkness of each cluster. This is because the clusters are formed from a set of tiled cells, each one having the same size. Associated with each cluster is a Threshold Array (TA) that defines the cell area region of each cluster. This TA is tiled across the continuous-tone image that is being rendered. The values in the TA are logically compared to the continuous-tone image values that are being rendered, to determine if the final halftoned image PEL is darkened or not. Halftones created in this fashion, having a single contone (continuous tone) image level and threshold levels, are referred to as "point operation" halftones. This is because only a single value from each array is used to determine the state of the PEL.

An advanced form of clustered dot halftoning, called "Supercell", essentially creates different TAs for adjacent dot clusters to increase the number of possible gray levels that can be rendered. These are combined into single larger TAs that can be tiled across the image and compared in a similar point-wise manner as with single cell halftones. The result is that additional levels of lightness are rendered into the final binary image because the larger TA contains additional unique TA levels. Historically e.g. offset printing, clustered dot halftones have been used to render pictures into a printable form. Offset printing employed photographic processes to prepare images for printing in its early history, prior to converting to recent Computer To Plate (CTP) technology. Electrophotographic technology adapted this same technology, employing it using a pixilated version to generate dot clusters having different sizes and shapes. It is well known from this historical setting, that modulated size dot clusters on a rotated fixed grid produce a satisfactory visually pleasing appearance. This clustering, when applied digitally in EP printers, also overcomes a known limitation that makes it difficult to print consistent isolated PELs.

Direct Multi-bit Scaling (DMS) of operation 310 or 410 is an iterative neighborhood processing halftoning process. An input 8 bit image or point screened image is iteratively processed to reduce the error difference between the filtered continuous-tone input and filtered multibit output image. As the iterations proceed, the DMS algorithm will reduce the appearance of the periodic structure present in the initial input halftoned image and produce an aperiodic structure.

DMS may be applied to a contone image to reduce the periodicity of the image and change the bit depth to match the multibit screening capability of the printer. Typically a continuous-tone image from RIP data is eight bits. The screened data may be 1 or more bits. DMS may be implemented using any of a variety of different Human Visual System (HVS) models. The particular model may be selected based on the results that are obtained with particular types of images, printers, and other factors. One particular HVS model, once selected, has a defined functional form having a variability that is a function of the viewing distance and DPI of the image. The distance and DPI values combine to define the specific filter to be employed in the DMS algorithm. The filter is explicitly and completely defined once the HVS model set, viewing distance and DPI are established. As an alternative, instead of using DMS with HVS, a neighborhood halftoning technique may be used with HVS.

The DMS algorithm is an iterative/recursive search heuristic that uses a perceptual filter, such as a HVS model, to minimize the perceived error difference (E), between a continuous tone image (CTI) and its corresponding rendered halftone image (HTI). This error may be represented as:

$$\epsilon = |h(x,y)g(x,y) - h(x,y)f(x,y)|^2 dxdy, \quad \text{Eq.6}$$

where ** denotes 2-dimensional convolution, h(x,y) represents the point spread function (PSF) of the HVS or other suitable filtering function, f(x,y) is the continuous tone original image and g(x,y) is the halftone image corresponding to the original image, where all image values are assumed to lie between 0 (white) and 1 (black).

The halftone image g(x,y) itself incorporates a printer model.

$$g(x,y) = \Sigma_m \Sigma_n g[m,n] p(x-mX, y-nX), \quad \text{Eq.7}$$

which represents the combination of the digital halftone image g[m,n] with a spot profile p(x,y) having device PEL spacing X, where X is the inverse of the printer addressability DPI. Superposition is assumed in this model for the interaction between overlapping spots. The digital halftone image g[m,n] can have any absorptance value between 0 (white) and 1 (black).

Figure 5:
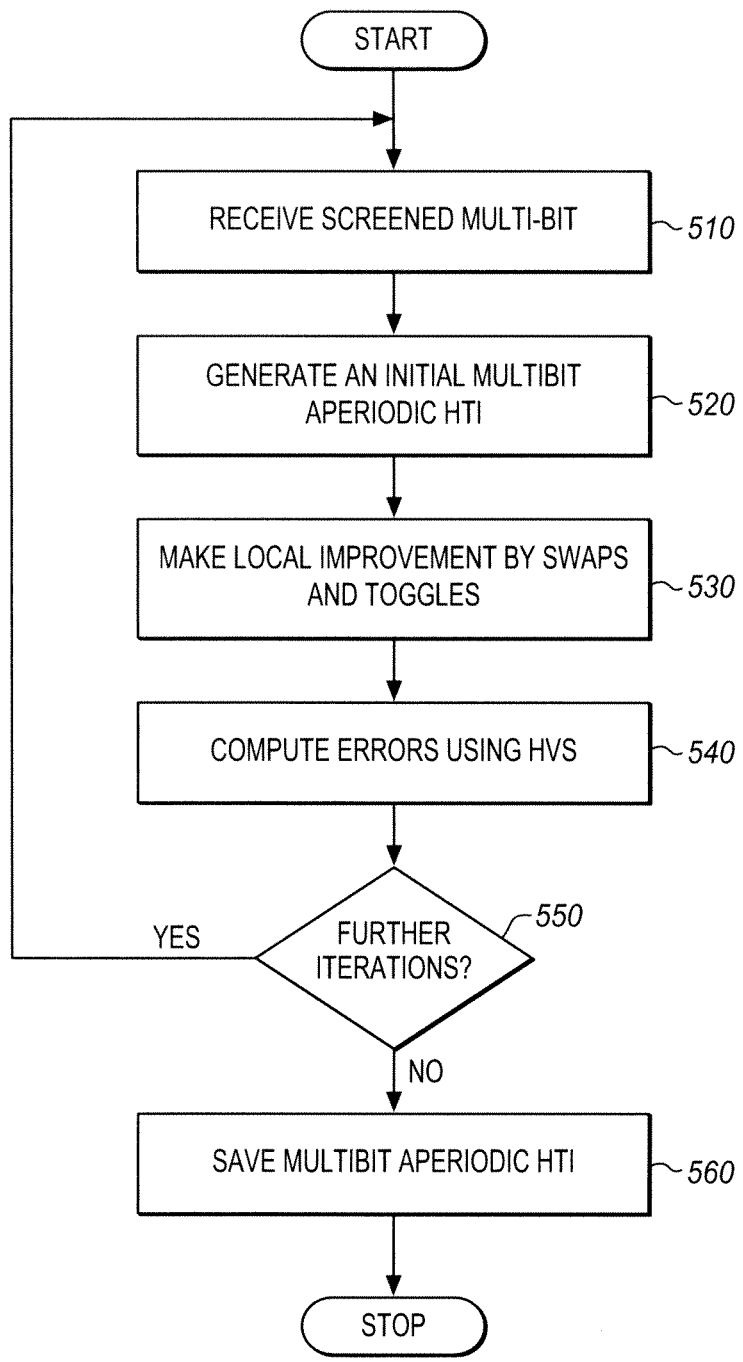
FIG. 5 illustrates a process flow of iterating with DMS to converge on a final haftone image according to an embodiment.

FIG. 5 is a process flow diagram showing DMS as an iterative approach that uses several passes through the halftone image (HTI) before converging to the final HTI. The DMS algorithm receives the point screened HTI at 510 from the point operation screening 306, 406 and starts at 520 by generating an initial HTI. A local improvement to the HTI is produced at 530 by swapping and toggling. Errors are computed and the cost function is calculated at 540 to determine an error that is perceptually filtered using an HVS model. The cost function is compared to a target cost. If the cost is not met at 550 then further iterations are performed. The iterations ultimately result in an optimized HTI saved at 560 by selecting the most appropriate swaps and toggles. Swapping may be described as the operation of switching the absorptance values of nearby pixels. Toggling may be described as the operation of changing the absorptance value of individual pixels.

The cost function may be represented as $\epsilon = <\tilde{e},\tilde{e}>$, where $<,>$ denotes the inner product and $\tilde{e}(x,y) = h(x,y)**(g(x,y)-f(x,y))$ represents the perceptually filtered error. In such an embodiment, the CTI f(x,y) may also be expressed in terms of its samples f[m,n] where (m,n) are coordinates on the halftone array or printer grid. Thus, the perceived error is given by $$\tilde{e}(x,y) = \Sigma_{m,n} e[m,n] \tilde{p}(x-mX, y-nX), \quad \text{Eq.8}$$

where e[m,n]=g[m,n]−f[m,n], and $\tilde{p}(x,y)=h(x,y)**p(x,y)$ is the perceived printer spot profile.

Considering the effect of a trial change. The new error will be $\tilde{e}' = \tilde{e} + \Delta\tilde{e}$. Substituting this and expanding the inner product results in $\epsilon' = \epsilon + 2<\Delta\tilde{e}, \tilde{e}> + <\Delta\tilde{e}, \Delta\tilde{e}>$, assuming all signals are real-values. Either a toggle at pixel $(m_0, n_0)$ or a swap between pixels $(m_0, n_0)$ and $(m_1, n_1)$ can be represented as $g'[m,n]=g[m,n]+\Sigma_i a_i \delta[m-m_i, n-n_i]$. As a result, $$\Delta\tilde{e}(x,y) = \Sigma_i a_i \tilde{p}(x-m_i X, y-n_i X), \text{ and} \quad \text{Eq.9}$$

$$\Delta\epsilon = 2\Sigma_i c_{\tilde{p}e}[m_i, n_i] + \Sigma_{i,j} a_i a_j c_{\tilde{p}\tilde{p}}[m_i - m_j, n_i - n_j], \text{ where} \quad \text{Eq.10}$$

$$c_{\tilde{p}e}[m,n] = <\tilde{p}(x,y), \tilde{e}(x+mX, y+nX)>, \text{ and} \quad \text{Eq.11}$$

$$c_{\tilde{p}\tilde{p}}[m,n] = <\tilde{p}(x,y), \tilde{p}(x+mX, y+nX)>. \quad \text{Eq.12}$$

In one embodiment, assuming that a given printer can produce S possible output states/drops with absorptance levels $\alpha_1, \alpha_2, \ldots, \alpha_s$ at every PEL location. Then, $a_i$ represents the amount of change in the gray level for toggle as: $a_i = g_{new}[m_i, n_i] - g_{old}[m_i, n_i]$. A swap between pixels i and j is equivalent to two toggles with $g_{new}[m_j, n_j] = g_{old}[m_i, n_i]$ and $g_{new}[m_i, n_i] = g_{old}[m_j, n_j]$. Thus, the amount of change in the gray level for swap is represented as $a_i = g_{old}[m_j, n_j] - g_{old}[m_i, n_i]$ and $a_j = g_{old}[m_i, n_i] - g_{old}[m_j, n_j]$. Then $a_j = -a_i$ except for j=0 (e.g., toggle, $a_0 = 0$).

Figure 6:
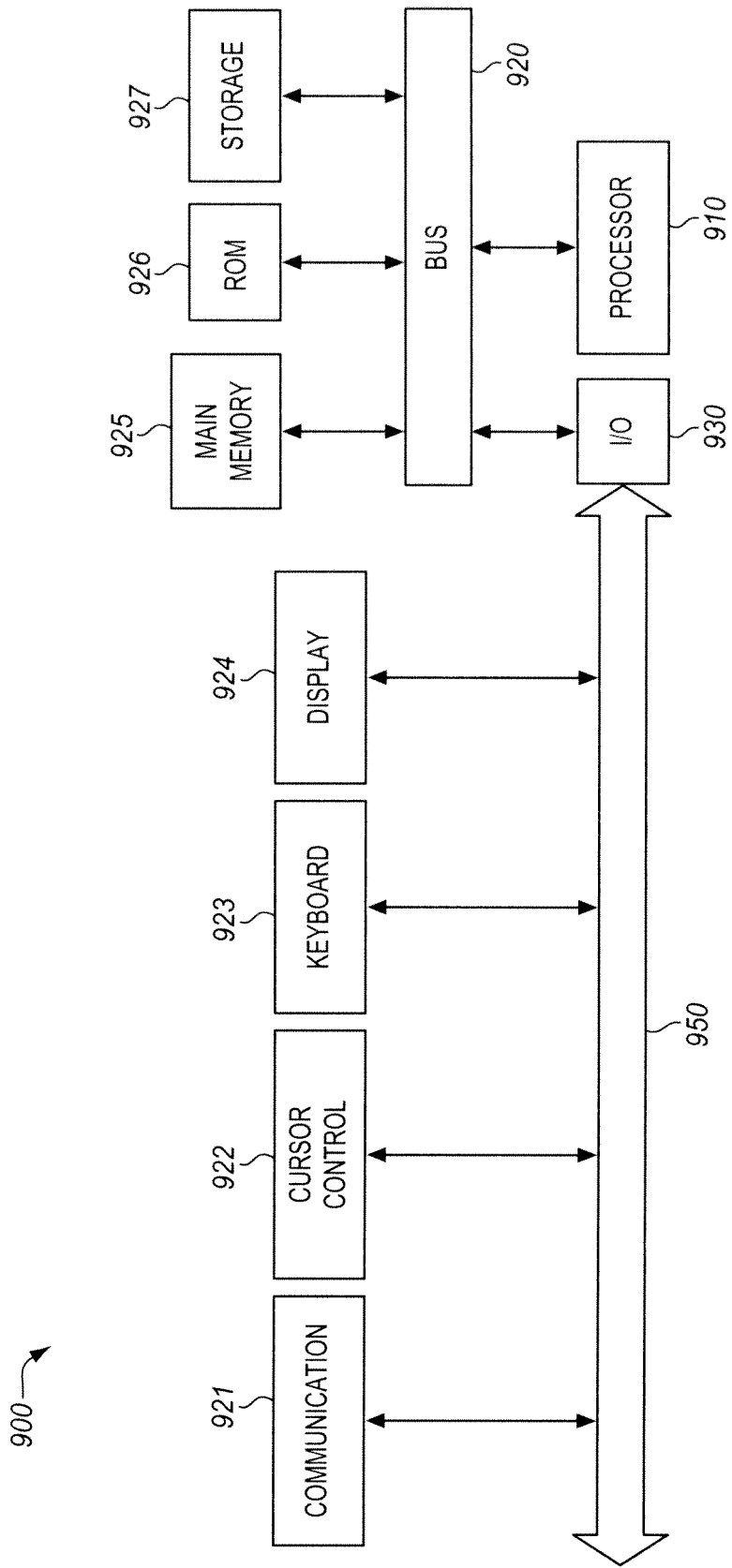
FIG. 6 illustrates one embodiment of a computer system.

FIG. 6 illustrates a computer system 900 on which print controller 140 and/or host system 110 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 925 such as a magnetic disk or optical disc and its corresponding drive may also be coupled to computer system 900 for storing information and instructions. Computer system 1000 can also be coupled to a second I/O bus 950 via an I/O interface 930. A plurality of I/O devices may be coupled to I/O bus 950, including a display device 924, an input device (e.g., an alphanumeric input device 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

The techniques described herein are optimized for use with images. However, the same or similar techniques may also be used to convert saved documents that include line art and embedded text without using additional segmented operations.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a machine-readable medium including data that, when accessed by a machine, causes the machine to perform operations comprising:
   receiving a first image as a continuous tone image;
   screening the image to render a second image as a (Halftone Image) HTI;
   selecting an area of the first image for enhancement, including:
      analyzing the first image to determine object types; and
      comparing the object types to a predetermined ranked list of object types and selecting areas corresponding to the object types that rank highest on the list; and
   iteratively processing the selected areas of the first image to render a third image as a multibit HTI.

2. The medium of claim 1, wherein selecting an area comprises selecting an area containing natural scene image data.

3. The medium of claim 1, wherein selecting an area comprises selecting an area corresponding to an image, provided that the image has a size that is less than a threshold image size.

4. The medium of claim 1, wherein iteratively processing comprises applying a Direct Multibit Search (DMS) algorithm to render the third image as a multibit aperiodic HTI.

5. The medium of claim 4, wherein applying a DMS algorithm comprises:
   computing a change in pixel error for a first pixel by toggling a first pixel of the scaled image with possible output states; and
   swapping the first pixel with all neighbor pixels.

6. The medium of claim 5, wherein computing a change in pixel error comprises finding an operation with a maximum decrease in pixel error for the first pixel after computing the change in pixel error.

7. A method comprising:
   receiving a first image as a continuous tone image;
   screening the image to render a second image as a (Halftone Image) HTI;
   selecting an area of the first image for enhancement, including:
      analyzing the first image to determine object types; and
      comparing the object types to a predetermined ranked list of object types and selecting areas corresponding to the object types that rank highest on the list; and
   iteratively processing the selected areas of the first image to render a third image as a multibit HTI.

8. The method of claim 7, wherein selecting an area comprises selecting a plurality of areas, the number of areas being limited by a buffer size of a processor for iterative processing.

9. The method of claim 8, wherein selecting an area comprises selecting an area corresponding to an image, provided that the image has a size that is less than a threshold image size.

10. The method of claim 7, wherein iteratively processing comprises applying a Direct Multibit Search (DMS) algorithm to render a third image as a multibit aperiodic HTI.

11. The method of claim 10, wherein applying a DMS algorithm comprises:
    computing a change in pixel error for a first pixel by toggling a first pixel of the scaled image with possible output states; and
    swapping the first pixel with all neighbor pixels.

12. The method of claim 11, wherein computing a change in pixel error comprises finding an operation with a maximum decrease in pixel error for the first pixel after computing the change in pixel error.

13. A printing system comprising:
    a print engine; and
    a print controller operable for:
    receiving a first image as a continuous tone image;
    screening the image to render a second image as a (Halftone Image) HTI;
    selecting an area of the first image for enhancement, including:
       analyzing the first image to determine object types; and
       comparing the object types to a predetermined ranked list of object types and selecting areas corresponding to the object types that rank highest on the list; and
    iteratively processing the selected areas of the first image to render a third image as a multibit HTI.

14. The system of claim 13 wherein selecting an area comprises:
    analyzing the first image to determine object types; and
    selecting an area having a particular object type.

15. The system of claim 14, wherein selecting an area comprises selecting an area containing natural scene image data.

16. The system of claim 14, wherein selecting an area comprises selecting an area corresponding to an image, provided that the image has a size that is less than a threshold image size.

* * * * *